US011415547B2

(12) United States Patent
Langridge et al.

(10) Patent No.: US 11,415,547 B2
(45) Date of Patent: Aug. 16, 2022

(54) ION FILTERING DEVICES

(71) Applicant: Micromass UK Limited, Wilmslow (GB)

(72) Inventors: David J. Langridge, Macclesfield (GB); Jason Lee Wildgoose, Stockport (GB); Martin Raymond Green, Bowdon (GB); Daniel James Kenny, Northwich (GB); Kevin Giles, Stockport (GB); Steven Derek Pringle, Darwen (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 17/274,877

(22) PCT Filed: Sep. 10, 2019

(86) PCT No.: PCT/GB2019/052526
§ 371 (c)(1),
(2) Date: Mar. 10, 2021

(87) PCT Pub. No.: WO2020/053576
PCT Pub. Date: Mar. 19, 2020

(65) Prior Publication Data
US 2022/0099627 A1    Mar. 31, 2022

(30) Foreign Application Priority Data
Sep. 10, 2018 (GB) ..................... 1814681

(51) Int. Cl.
*G01N 27/623* (2021.01)
*H01J 49/00* (2006.01)
(Continued)

(52) U.S. Cl.
CPC ..... *G01N 27/623* (2021.01); *G01N 27/44717* (2013.01); *G01N 27/44739* (2013.01);
(Continued)

(58) Field of Classification Search
CPC ................. G01N 27/623; G01N 27/49; G01N 27/44717; G01N 27/44739; G01N 2015/0019; H01J 49/0031; H01J 49/062
(Continued)

(56) References Cited

U.S. PATENT DOCUMENTS

2004/0245452 A1* 12/2004 Bateman .................. H01J 49/40
250/287
2009/0189070 A1    7/2009 Clemmer et al.

FOREIGN PATENT DOCUMENTS

GB    2486584 A    6/2012
GB    2498092 A    7/2013
(Continued)

OTHER PUBLICATIONS

International Search Report and Written Opinion for International Application No. PCT/GB2019/052526, dated Nov. 26, 2019.
(Continued)

*Primary Examiner* — Kiet T Nguyen
(74) *Attorney, Agent, or Firm* — Goodwin Procter LLP

(57) ABSTRACT

A method of filtering ions according to their ion mobility using a device is disclosed, the method comprising a plurality of electrodes and one or more voltage source(s) arranged and adapted to apply voltages to the plurality of electrodes, the method comprising, generating using the one or more voltage source(s) one or more local separation region(s), wherein ions can be separated within each local separation region according to their ion mobility, and moving each local separation region axially along the device with a certain velocity such that, for each local separation
(Continued)

region, ions having a value of their ion mobility falling within a selected range are transmitted axially along the device with that local separation region whereas ions having higher and/or lower ion mobility falling outside that range escape the local separation region, wherein any ions that escape the local separation region(s) are removed from within the device and/or otherwise kept apart from those ions falling within the selected range(s).

20 Claims, 4 Drawing Sheets

(51) Int. Cl.
*H01J 49/06* (2006.01)
*G01N 27/447* (2006.01)
*G01N 27/49* (2006.01)
*G01N 15/00* (2006.01)

(52) U.S. Cl.
CPC .......... *G01N 27/49* (2013.01); *H01J 49/0031* (2013.01); *H01J 49/062* (2013.01); *G01N 2015/0019* (2013.01)

(58) Field of Classification Search
USPC ........................................................ 250/286
See application file for complete search history.

(56) References Cited

FOREIGN PATENT DOCUMENTS

| GB | 2498093 A | 7/2013 |
| GB | 2555247 A | 4/2018 |

OTHER PUBLICATIONS

Giles, K., et al., "Applications of a Travelling Wave-Based Radio-Frequency-Only Stacked Ring Ion Guide", Rapid Communications in Mass Spectrometry, 18(20):12401-2414, Sep. 13, 2004.
Search Report for GB Application No. GB1814681.1, dated Mar. 29, 2019.
Combined Search and Examination Report for GB Application No. GB1913063.2, dated Jan. 31, 2020.

* cited by examiner

ION FILTERING DEVICES

CROSS-REFERENCE TO RELATED APPLICATIONS

This application is a U.S. national phase filing claiming the benefit of and priority to International Patent Application No. PCT/GB2019/052526, filed Sep. 10, 2019, which claims priority from and the benefit of United Kingdom patent application No. 1814681.1 filed on Sep. 10, 2018. The entire contents of these applications are incorporated herein by reference.

FIELD OF THE INVENTION

The present invention relates generally to methods and devices for filtering ions according to a physicochemical property, such as ion mobility, and particularly to methods of mass spectrometry and mass spectrometers including such devices.

BACKGROUND

It is known to analyse ions by separating the ions according to a physicochemical property, such as ion mobility, and then detecting the separated ions such that different species of ions can be distinguished based on their different detection times. Conventional linear field or travelling wave ion mobility separator devices operate in a pulsed fashion wherein ions are released into the device in discrete packets and then caused to separate along the device according to their ion mobility. Ions thus exit the device at a certain drift time (measured from the packet release) that is related to their ion mobility, and so by recording the ions exiting the device it is possible to produce a drift time (ion mobility) spectrum for these ions. The frequency of the pulsing in such devices is limited by the time required for the slowest ion species to exit the device, which can result in relatively low duty cycle (e.g. 1% or less). The duty cycle can be improved by trapping ions before they are released into the device but this can then introduce space charge issues.

Multiplexed ion mobility separators are also known wherein ions are pulsed into the device with higher pulsing frequencies such that ions from different pulses may overlap or overtake each other within the device. The higher pulsing frequency can help improve the duty cycle (and/or reduce space charge effects where trapping is employed). However, as the ions from consecutive pulses are allowed to overlap, the resulting signals for the ions recorded exiting the device may then require additional processing (deconvolution) to obtain meaningful drift time (ion mobility) spectra.

In some cases, only a single ion species, or a relatively narrow ion mobility range of ions, may be of interest, in which case it may be relatively inefficient to separate all of the ions using a conventional ion mobility separator as described above. Thus, it is also known to perform ion mobility filtering wherein only ions whose mobility falls within a certain range are transmitted by the device. In this case, the output is limited to the ion species of interest. Filters can typically be operated with a continuous beam or a shorter trap/release cycle, thus operating with a higher duty cycle without requiring ion trapping or introducing space charge effects. Furthermore the output of a filter is typically significantly less packetized in time than the output of a separator.

Currently available ion mobility filters include field-assisted ion mobility separation ('FAIMS') or differential mobility separation ('DMS') devices. However, it will be appreciated that these devices separate based on the differential mobility in high and low field conditions, rather than being a true ion mobility filter, and so may be somewhat inaccurate when used to filter based on ion mobility. Furthermore, current FAIMS and DMS devices often have a relatively lower sensitivity. Also, DMS devices require a laminar flow of gas orthogonal to the driving electric field which can be difficult to maintain such that the implementation of a DMS device may be relatively complex.

Accordingly, it is desired to provide improved devices for filtering ions according to ion mobility and/or other physicochemical properties.

SUMMARY

From a first aspect, there is provided a method of filtering ions according to a physicochemical property using a device comprising a plurality of electrodes and one or more voltage source(s) arranged and adapted to apply voltages to the plurality of electrodes, the method comprising:

generating using the one or more voltage source(s) one or more local separation region(s), wherein ions can be separated within each local separation region according to the physicochemical property; and moving each local separation region axially along the device with a certain velocity such that, for each local separation region, ions having a value of the physicochemical property falling within a selected range are transmitted axially along the device with that local separation region whereas ions having higher and/or lower values of the physicochemical property falling outside that range escape the local separation region, wherein any ions that escape the local separation region(s) are removed from within the device and/or otherwise kept apart from those ions falling within the selected range(s).

From a second aspect, there is provided a device for filtering ions according to a physicochemical property, the device comprising:

a plurality of electrodes; and one or more voltage source(s) arranged and adapted to apply voltages to the plurality of electrodes so as to generate, in use, one or more local separation region(s), wherein ions can be separated within each local separation region according to the physicochemical property, and wherein each local separation region moves axially along the device such that with a certain velocity such that, for each local separation region, ions having a value of the physicochemical property falling within a selected range are transmitted axially along the device with that local separation region whereas ions having higher and/or lower values of the physicochemical property falling outside that range escape the local separation region, wherein any ions that escape the local separation region(s) are removed from within the device and/or otherwise kept apart from those ions falling within the selected range(s).

Embodiments described herein provide for an efficient filtering of ions, e.g. with higher sensitivity and/or duty cycle, whilst still allowing for a relatively low complexity implementation (such that a relatively simple device structure can be provided). This is achieved by generating one or more local separation region(s) that are translated axially along the device and that each act to filter (out) ions having a certain range of the physicochemical property of interest.

In particular, the velocity at which each local separation region is translated axially along the device is selected to cause ions having a certain value (or range of values) of the physicochemical property to be carried along with the local separation region. Ions falling within the selected range(s) of the physico-chemical property are thus transmitted along with the local separation region(s) as the local separation region(s) are translated axially along the device.

However, for each local separation region, ions falling outside the selected range will escape the local separation region, either by travelling faster than the local separation region (and so moving ahead of the local separation region and 'falling off' the front) or by travelling slower than the local separation region (and so 'falling off' the back of the local separation region).

Any ions that escape the local separation region(s) are then kept separate from the ions having the desired values of the physicochemical property and that are therefore transmitted along with the local separation region(s).

Particularly, the regions of the device adjacent to a local separation region, or in between local separation regions wherein multiple local separation regions are provided, can be arranged to keep any ions that escape from a local separation region separate from the ions transmitted by that local separation region. For example, these regions may be configured to remove those ions from the device and/or to otherwise keep those ions apart from those having the desired values of the physicochemical property. In this way, ions having the desired value of the physicochemical property can be efficiently filtered (out). These regions also therefore keep the ions that are transmitted with each local separation region separate, e.g. from ions transmitted by other local separation regions where multiple local separation regions are provided.

For instance, in embodiments, ions may be filtered within the device such that only ions having a selected value, or range of values, of the physico-chemical property are onwardly transmitted by the device (e.g. for subsequent analysis and/or detection). Thus, in embodiments, for each local separation region, ions having a value of the physico-chemical property falling within the selected range are transmitted axially through the device towards an ion exit, whereas ions having values falling outside the selected range of the physicochemical property are not transmitted through the device and are lost.

In this case, the regions of the device adjacent to the local separation region(s) may be arranged to cause ions that escape from the local separation region(s) to be removed from the device. For example, the ions may be driven towards the electrodes (and thus lost), or driven (e.g. radially) out of the device. This may be achieved in various possible ways. For example, a confining RF voltage could be disabled in these regions and/or a DC field could be applied to drive the ions towards the electrodes or through an exit orifice.

In other embodiments, for each local separation region, ions having a value of the physicochemical property falling within the selected range are transmitted axially through the device towards an ion exit as a first ion packet, while whereas any ions having higher and/or lower values of the physicochemical property and that escape from the local separation region are transmitted towards the ion exit as one or more separate ion packets.

For example, the voltage source(s) may be used for generating one or more DC potential wells adjacent to the local separation regions, or one or more DC barriers at the edges of the local separation regions, so that any ions escaping a local separation region are then trapped and transmitted as a corresponding one or more ion packets towards the ion exit.

In this case, the ions that escape the local separation region(s) and are transmitted separately towards the ion exit may be discarded at the exit of the device. Alternatively, these ions may be transmitted onwardly (as separate ion packets to the filtered ions).

In another embodiment, ions that escape the local separation regions may be ejected radially from the device. These ions can then be onwardly transmitted. For example, ions may be ejected into a radially adjacent ion guide and then transmitted onwards for detection and/or analysis. A slot or gap may be provided along the device to allow ions to be ejected radially. Also, the ions may be ejected between adjacent electrodes.

Thus, for each local separation region, ions having a value of the physicochemical property falling within the selected range may be transmitted axially along the device, whereas ions having values falling outside the selected range of the physicochemical property are ejected radially from the device for onward transmission. In this case, the ions that are transmitted axially may be lost (so that the device acts as a reverse filter to remove the ions within the selected range(s)) or may also be transmitted onwardly through an axial ion exit (so that all of the ions are transmitted but along different paths).

In embodiments, the physicochemical property is ion mobility. That is, in embodiments, the ions are separated within each local separation region, and hence filtered, based on their ion mobility. However, it will be appreciated that by suitably configuring the local separation regions to separate ions based on different ion characteristics the ions may be filtered according to any suitable physico-chemical property as desired, including, for instance, mass, mass-to-charge ratio, time of flight, mixed mass-to-charge ratio and ion mobility, differential ion mobility (e.g. as in a FAIMS device).

Each local separation region acts to locally separate the ions (rather than the ions being separated along the device as a whole, as in more conventional ion mobility separator devices). That is, the ions are locally separated within each local separation region, which each have a limited axial extent. In general, a given ion will be separated in only a single local separation region. So, for example, once an ion has escaped a local separation region, it will not then be separated again (e.g. in a subsequent local separation region, where multiple are provided) but is instead removed from the device and/or kept apart from the ions that transmitted along with the local separation region.

Each local separation region may, for example, comprise an axial DC gradient for separating ions according to their ion mobility. The axial DC gradient may, for example, cause ions to separate within the local separation region according to their ion mobility. Where an axial DC gradient is provided, this may generally cause the ions to separate in the same direction as the movement of the local separation regions.

A substantially uniform DC gradient may be provided. However, this need not be the case, and in embodiments, the field may vary over the length of the local separation region, e.g. to alter the properties of the device. For example, the field may be lower at the front edge of the local separation region and higher at the rear edge, which will tend to increase the range of ions transmitted along with the local separation region, and may also provide additional focusing of the ions of interest (e.g. by reducing the diffusional spread). Alternatively, the opposite configuration may be used to increase the resolution and transmit a narrower range of ions.

In general, any suitable and desired field may be provided within each local separation region to achieve the desired separation.

For instance, it is not necessary to provide an axial DC gradient and various other suitable separation techniques may be used, e.g. depending on the desired separation. For example, rather than using an axial DC gradient to separate ions according to ion mobility, each local separation region may comprise a plurality of travelling waves (i.e. moving DC barriers or potential wells). In a travelling wave system a given ion will still travel with a certain mean drift velocity that is related to its ion mobility, and so the operation of the device in that case is fundamentally the same.

Furthermore, by increasing the travelling wave speed within each local separation region (using "fast travelling waves"), it is possible to enter an operating regime where ions are separated based on both their mass-to-charge ratio and ion mobility (so that the physico-chemical property according to which the ions are separated is a mixed mass-to-charge ratio and ion mobility). By increasing the travelling wave speed further, a regime can be reached where the ions are separated substantially based on mass-to-charge ratio (with substantially no ion mobility dependence).

The device is generally a gas cell containing a suitable drift gas for allowing the desired separation to be achieved. In embodiments, a (counter) gas flow may also be used to enhance the resolving power of the device. In other embodiments, a gas flow may be used to drive ions through the device, and to cause them to separate within the local separation regions.

In embodiments, the ions are confined radially within the device. For example, in embodiments the ions may be confined radially using RF potentials, or some combination of RF and DC potentials. However, it is also possible that the ions are unconfined, or periodically (re-)confined, within the device.

In embodiments, the method comprises applying a resolving field (e.g. a quadrupolar resolving field) at least to the local separation regions within the device such that only ions having a certain mass to charge ratio or mass-to-charge ratio range are transmitted through the device. Similarly, other mass or mass-to-charge ratio filtering (such as resonant radial ejection, quadrupolar excitation, low mass cut-off) may be applied on top of the filtering caused by the local separation regions. In these cases, the device is operable to filter simultaneously by the physicochemical property (e.g. ion mobility) and mass or mass-to-charge ratio.

The method may in embodiments comprise generating a plurality of local separation regions, wherein each local separation region acts to axially transmit ions having a value of the physicochemical property falling within a respective range of the physico-chemical property. Thus, at any instant in time, a plurality of local separation regions may be simultaneously present within the device for filtering a respective plurality of packets of ions.

Each of the plurality of local separation regions may act to filter out the same range. However, it is also contemplated that different local separation regions may act to filter different ranges of the physicochemical property (either by providing different local separation regions with different separating fields, and/or by causing different local separation regions to move at different axial velocities).

In embodiments, where a plurality of local separation regions are provided, the velocities of these regions, and the spacing thereof, may be selected to ensure that the local separation regions do not overtake each other. However, it would also be possible to allow the local separation regions to overtake each other (although this may require additional processing to track this).

The method may generally comprise injecting a packet ions through an ion entrance of the device when a local separation region is coincident with the ion entrance such that ions within the packet having values of the physicochemical property within a selected range are transmitted along the device along with the local separation region whereas ions having values falling outside the selected range escape the local separation region. So, the timing of the injection of ion packets to be filtered into the device may be selected or set in accordance with the rate at which the local separation regions are moved along the device.

The device may be operable to be switched between a filtering mode of operation and a second mode of operation wherein ions are separated according to the physicochemical property, e.g. where the device is operated as an ion mobility separator. For example, in the second mode of operation, a substantially linear drift field may be applied across the device to cause the ions to separate according to ion mobility. Similarly, in the second mode of operation, travelling waves and/or gas flows may be used to cause the ions to separate according to ion mobility. In the second mode of operation substantially all of the ions may be transmitted through the device.

The device may thus comprise a controller, or other switching means, for switching between these modes of operation. The method may comprise selecting a filtering mode of operation and/or switching between such modes.

The device may be a linear device wherein ions pass axially from an ion entrance at one end of the device towards an ion exit at other end of the device. However, it is also contemplated that the device may be a cyclic device.

The device may comprise a stacked ring ion guide comprising a plurality of electrodes each having an aperture through which ions are transmitted in use. Each of the electrodes (and apertures) may be substantially the same size. However, it is also contemplated that the sizes of the electrodes (apertures) may vary along the length of the device, e.g. to define an ion funnel. Opposite phases of an AC or RF voltage may be applied, in use, to successive electrodes (or groups of electrodes) for confining ions radially within the device.

However, various other arrangements are of course also possible. For example, in other embodiments, the device may comprise a segmented multipole ion guide such as a segmented quadrupole, hexapole, octapole or other higher order multipole ion guide. As another example, the device may alternatively comprise a plurality of substrates wherein the electrodes are patterned (printed) onto the substrates.

The device may comprise a device arranged and adapted to supply an AC or RF voltage to the electrodes. The AC or RF voltage optionally has an amplitude selected from the group consisting of: (i) about <50 V peak to peak; (ii) about 50-100 V peak to peak; (iii) about 100-150 V peak to peak; (iv) about 150-200 V peak to peak; (v) about 200-250 V peak to peak; (vi) about 250-300 V peak to peak; (vii) about 300-350 V peak to peak; (viii) about 350-400 V peak to peak; (ix) about 400-450 V peak to peak; (x) about 450-500 V peak to peak; and (xi) >about 500 V peak to peak.

The AC or RF voltage may have a frequency selected from the group consisting of: (i) <about 100 kHz; (ii) about 100-200 kHz; (iii) about 200-300 kHz; (iv) about 300-400 kHz; (v) about 400-500 kHz; (vi) about 0.5-1.0 MHz; (vii) about 1.0-1.5 MHz; (viii) about 1.5-2.0 MHz; (ix) about 2.0-2.5 MHz; (x) about 2.5-3.0 MHz; (xi) about 3.0-3.5

MHz; (xii) about 3.5-4.0 MHz; (xiii) about 4.0-4.5 MHz; (xiv) about 4.5-5.0 MHz; (xv) about 5.0-5.5 MHz; (xvi) about 5.5-6.0 MHz; (xvii) about 6.0-6.5 MHz; (xviii) about 6.5-7.0 MHz; (xix) about 7.0-7.5 MHz; (xx) about 7.5-8.0 MHz; (xxi) about 8.0-8.5 MHz; (xxii) about 8.5-9.0 MHz; (xxiii) about 9.0-9.5 MHz; (xxiv) about 9.5-10.0 MHz; and (xxv) >about 10.0 MHz.

The device may generally comprise a gas cell. The device may be maintained at a pressure selected from the group consisting of: (i) <about 0.0001 mbar; (ii) about 0.0001-0.001 mbar; (iii) about 0.001-0.01 mbar; (iv) about 0.01-0.1 mbar; (v) about 0.1-1 mbar; (vi) about 1-10 mbar; (vii) about 10-100 mbar; (viii) about 100-1000 mbar; and (ix) >about 1000 mbar.

The devices described herein may be provided as part of a mass and/or ion mobility spectrometer. Similarly, the methods disclosed herein may comprise methods of mass and/or ion mobility. Thus, from a further aspect there is provided a mass and/or ion mobility spectrometer comprising a device substantially as described herein.

The spectrometer disclosed herein may comprise an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; and (xxix) a Surface Assisted Laser Desorption Ionisation ("SALDI") ion source. The spectrometer may comprise one or more continuous or pulsed ion sources.

The spectrometer may comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The spectrometer may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The spectrometer may comprise a device or ion gate for pulsing ions; and/or a device for converting a substantially continuous ion beam into a pulsed ion beam.

The spectrometer may comprise a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

From a third aspect, there is provided a method of filtering ions according to ion mobility using a device comprising a plurality of electrodes and one or more voltage source(s) arranged and adapted to apply voltages to the plurality of electrodes, the method comprising:

generating using the one or more voltage source(s) a plurality of local separation region(s), wherein ions can be separated within each local separation region according to their ion mobility; and moving each local separation region axially along the device with a certain velocity such that, for each local separation region, ions having a value of ion mobility falling within a selected range are transmitted axially along the device with that local separation region whereas ions having higher and/or lower values of ion mobility of the physicochemical property falling outside that range escape the local separation region, wherein any ions that escape the local separation regions are removed from within the device and/or otherwise kept apart from those ions falling within the selected range(s).

BRIEF DESCRIPTION OF THE DRAWINGS

Various embodiments will now be described, by way of example only, and with reference to the accompanying drawings in which.

DETAILED DESCRIPTION

Figure 1:
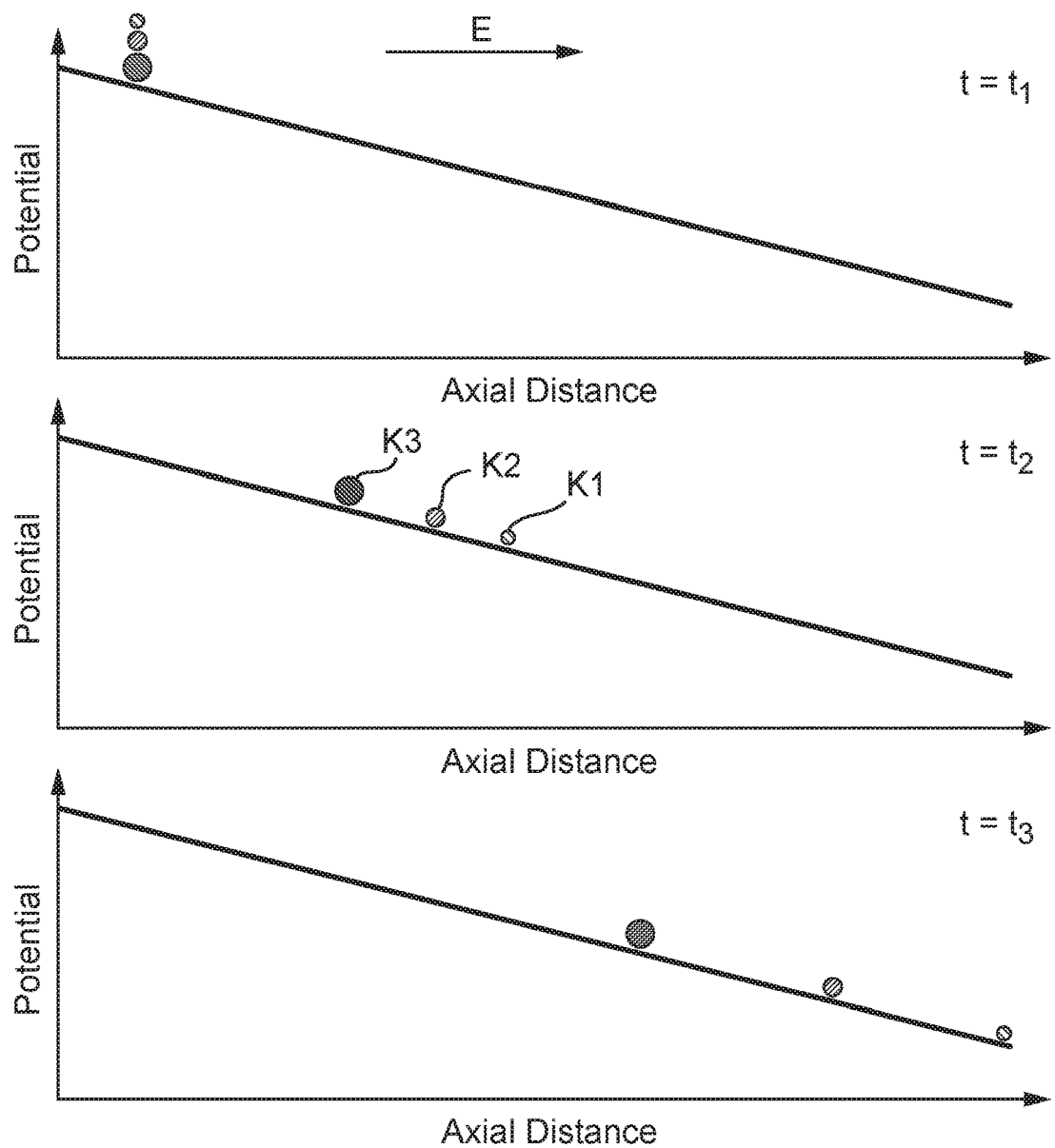
FIG. 1 shows schematically the operating principle behind a traditional linear field ion mobility separation device.

FIG. 1 shows a potential energy diagram for a typical linear field IMS cell. There is a linear drop in potential across the device, this gives rise to a constant axial field, E. The drift velocity of ions in a constant field is related to their mobility K by $$v_d = KE$$

In FIG. 1, three ions of differing ion mobility (K1, K2, K3) are injected into the cell at a time t1 with identical initial positions at the entrance of the cell. As per the equation above, the ions move with a drift velocity proportional to their mobility. Hence, at time t2, the ions are spatially separated with the higher mobility ion (K1) having traversed the greatest axial distance, and the lower mobility ions (K2, K3) having traversed a shorter distance. At time t3, the highest mobility ion K1 has now reached the end of the device, and exits the device, whilst the other two ions are still traversing the device.

The output of this device is thus a sequence of ion populations separated in drift time according to their mobility. Individual ion species are therefore compressed into relatively narrow peaks in the drift time spectrum depending on the resolving ability of the device.

Figure 2:
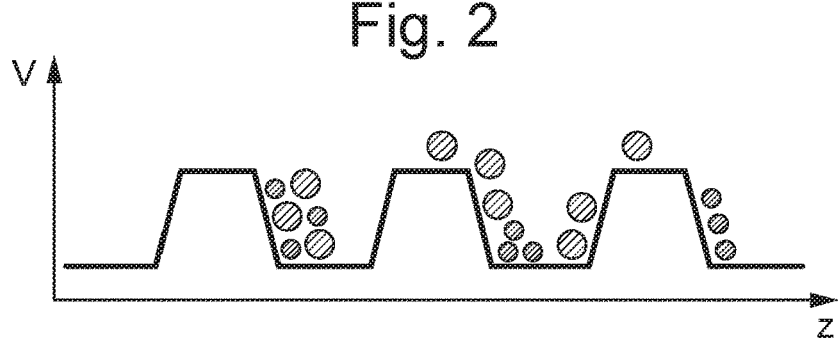
FIG. 2 shows schematically the operating principle behind a traditional travelling wave ion mobility separation device.

FIG. 2 then illustrates a typical operation of a travelling wave IMS cell. In this case, rather than applying a constant axial field along the length of the device, as in FIG. 1, there are now a plurality of DC potential barriers that move along the device at a certain velocity to create a set of travelling waves that push ions towards the ion exit. Ions are periodically overtaken by the pulses, or waves, with the less mobile species being overtaken more often than the higher mobility species so that the ions are thus separated according to their ion mobility. In conventional IMS, whether using linear or travelling wave fields, it is normally necessary to wait until the slowest ion has traversed the device before a new packet of ions is introduced, to prevent potential interference between high and low mobility ions from adjacent packets. Since the gate time for introducing ions is generally only a small fraction of the drift time, the device may have a low duty cycle. The duty cycle can be improved by trapping the ions upstream of the IMS device. However, this can introduce space charge effects due to the limited ion trap capacity. Furthermore, by its nature, the output from the IMS device is highly packetized in time, which can have deleterious effects on downstream analysers and detection systems.

Multiplexed IMS is also known wherein ions are pulsed (gated) into the IMS device at a higher frequency, so that ions from different packets are allowed to interfere. This increases the duty cycle but the resulting signal then requires additional processing (deconvolution) to obtain an IMS spectrum.

Furthermore, in some cases, it is not desired to obtain a full IMS spectrum, and only a single species, or a relatively narrow range of ions, are of interest. In this case, a traditional IMS device may be inefficient.

Accordingly, in embodiments, there is provided a device that may be structurally similar to a conventional IMS device, but can be operated in an ion filtering mode with a relatively high duty cycle. In use, a number of local separation regions are generated that each comprise an axial DC field, and that each travel axially along the device with some given velocity. Ions can then be injected into the device when these regions coincide with the entrance end of the device. When an ions drift velocity in the DC field matches the velocity of the DC drive region the ion will then remain in the DC drive region as it moves down the device, and thus be transmitted to the exit end of the device. On the other hand, ions of a higher mobility will overtake the region of DC drive field, and ions of a lower mobility will be overtaken by the DC drive field. These ions will thus escape from the local separation region.

Figure 3:
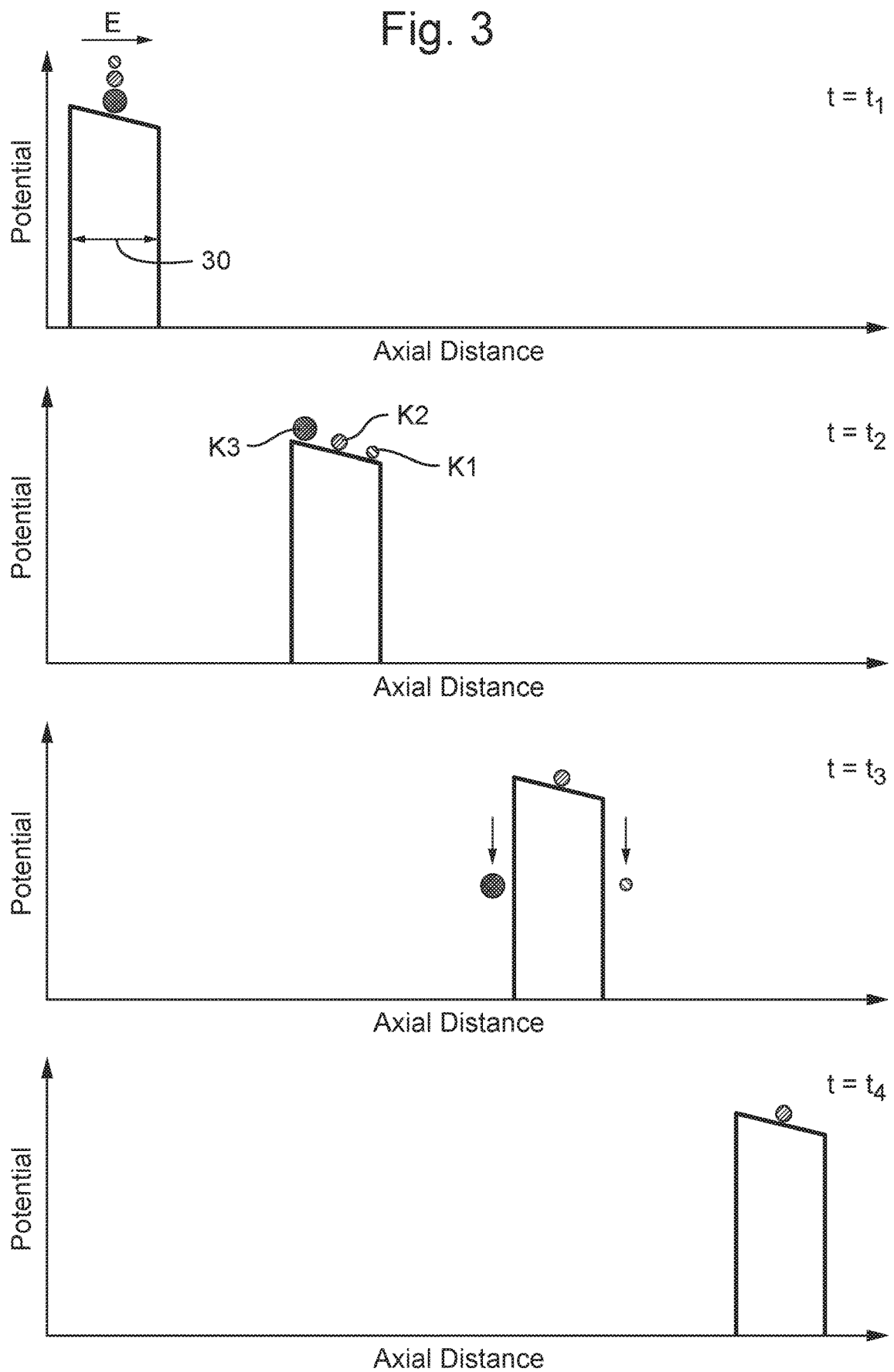
FIG. 3 shows schematically the operating principle behind an ion filtering device according to an embodiment comprising a local separation region for filtering ions having a selected range of ion mobility.

FIG. 3 shows an example of an embodiment wherein a local separation region 30 is generated along a portion of the device. In FIG. 3, the local separation region 30 is a small region that has a linear DC voltage drop (hence constant field E) applied across it, whereas in the rest of the device ions are not confined. The local separation region 30 is moved across the device with some chosen velocity selected to filter ions having a particular mobility (in this example the region is moved at the drift velocity of the middle mobility ion (K2), i.e. at a velocity v=K2.E). As in FIG. 1, three ions (K1, K2, K3) are injected into the local separation region 30 at the start of the device at time t1. At time t2, since the DC region 30 and the selected ion (K2) are moving with the same average velocity, the ion (K2) remains in the centre of the local separation region 30, whereas the higher and lower mobility ions (K1, K3) are separating towards the front and back of the region respectively. At time t3 the high and low mobility ions have exceeded the spatial extent of the local separation region 30, and thus escape from the local separation region 30 and are lost from the device. When the local separation region 30 reaches the exit of the device at time t4 only the selected ion (K2) remains in the region, and is then transmitted. The original ion packet has thus been filtered to transmit only the selected ion (K2).

Figure 4:
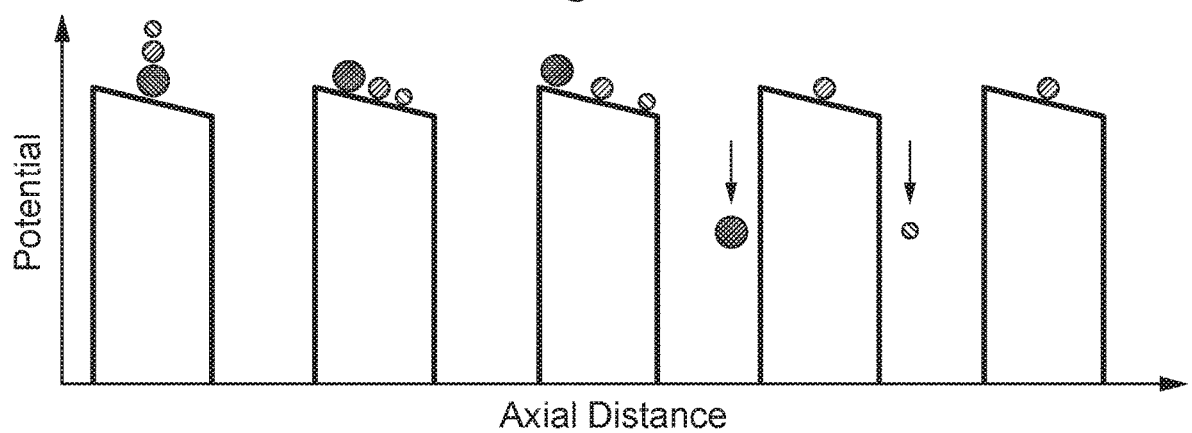
FIG. 4 shows another embodiment of an ion filtering device similar to that shown in FIG. 3, but comprising a plurality of local separation regions for simultaneously filtering a plurality of ion packets.

FIG. 4 shows a system similar to that of FIG. 3 but in which there are now a plurality of local separation regions traversing the drift cell simultaneously. The local separation regions are periodically created at the start of the device, populated with ions, and move down the device with a chosen velocity as above. If the local separation regions all have the same velocity they cannot catch up with or be overtaken by other regions, and since the local separation regions are separated by regions where the ions are lost to the device the separation of the ions in each region is independent of the other regions.

Thus, by contrast to conventional linear field IMS devices (as shown in FIG. 1) or traveling wave IMS devices (as shown in FIG. 2), in the present device there is local separation within each DC drive region (rather than ions being separated along the length of the device).

FIG. 4 thus shows a snapshot at a single instance in time wherein the device is populated by multiple regions with differing ion populations according to their evolution down the device. As above, because the velocity of the regions is chosen to match the drift velocity of the middle mobility ion (K2), at the exit of the device only this ion is transmitted.

It will be appreciated that this system is in some ways similar to a multiplexed IMS in that we have a higher pulse frequency than would be possible with a conventional IMS. However, whereas multiplexed IMS allows ion packets to overlap, and hence requires deconvolution to obtain an IMS spectrum, in the present system the ions that are carried by each DC drive region are prevented from overlapping (by the intermediate regions).

The duty cycle of this system will depend on the gate on/off ratio. However, as an example, when a continuous beam is passed into a device having a plurality of local separation regions of a given length separated by equal lengths of non-transmitting region, the duty cycle would then be approximately 50% (although this could be further improved by trapping before injection or switching into parallel devices, for example). The pulsing frequency for this invention is thus a function of the drift velocity of the DC regions. The output of this system would resemble a square wave, thus significantly less packetized than the output from a conventional IMS.

By considering such a device in the absence of diffusion it is possible to perform a simple calculation of the resolving ability. For instance, there is a drift region of length Lr moving with velocity vd, where the velocity matches the drift velocity of the selected ion, i.e. vd=K2*E. The total device length is L, hence the drift time, td=L/vd.

The cases for upstream trapping, where ions are released into the centre of the drift region, or for a continuous beam where they evenly fill the initial drift region can be considered separately.

For the case where ions are trapped and injected into the centre of the region we wish to find the higher and lower mobility values that will have just left the drift region when it reaches the end of the device, this is then the mobility range that is transmitted by the filter. Hence, by equating the required drift distance with td*drift velocity, it can be seen that:

$$L1=L+Lr/2=td*K1*E$$

$$L3=L-Lr/2=td*K3*E$$

These expressions can then be solved for K1 and K3 to give:

$$K1=(L+Lr/2)/td*E$$

$$K3=(L-Lr/2)/td*E$$

and hence:

$$dK=Lr/td*E$$

Since vd=K2*E, we can then rearrange to give:

$$K2=L/td*E$$

and thus an approximate resolving ability K/dK of:

$$R=L/Lr$$

Thus, the resolving ability in the absence of diffusion is just a geometrical factor of the total length divided by the region length. (For the continuous beam case we replace Lr/2 with Lr in the above derivation, which doubles dK and halves the resolving ability.) For a 200 mm device with 10 mm drift regions we would have an upper limit of resolving ability of 20 for the trap fill and 10 for the continuous fill.

In a real device the peaks will also undergo broadening due to diffusion, hence the actual resolving ability will be lower than the analytic result above. For example, consider a system as above, at a pressure of 2.25 torr, E=1000 V/m, selected ion K2=0.0395 m2/Vs, L=0.2, Lr=0.01.

The RMS diffusion is given by:

$$\delta = \sqrt{\frac{2k_b T K t}{q}}$$

where t is the time, K mobility, q elementary charge, T temperature and $k_b$ Boltzmann's constant.

Figure 5:
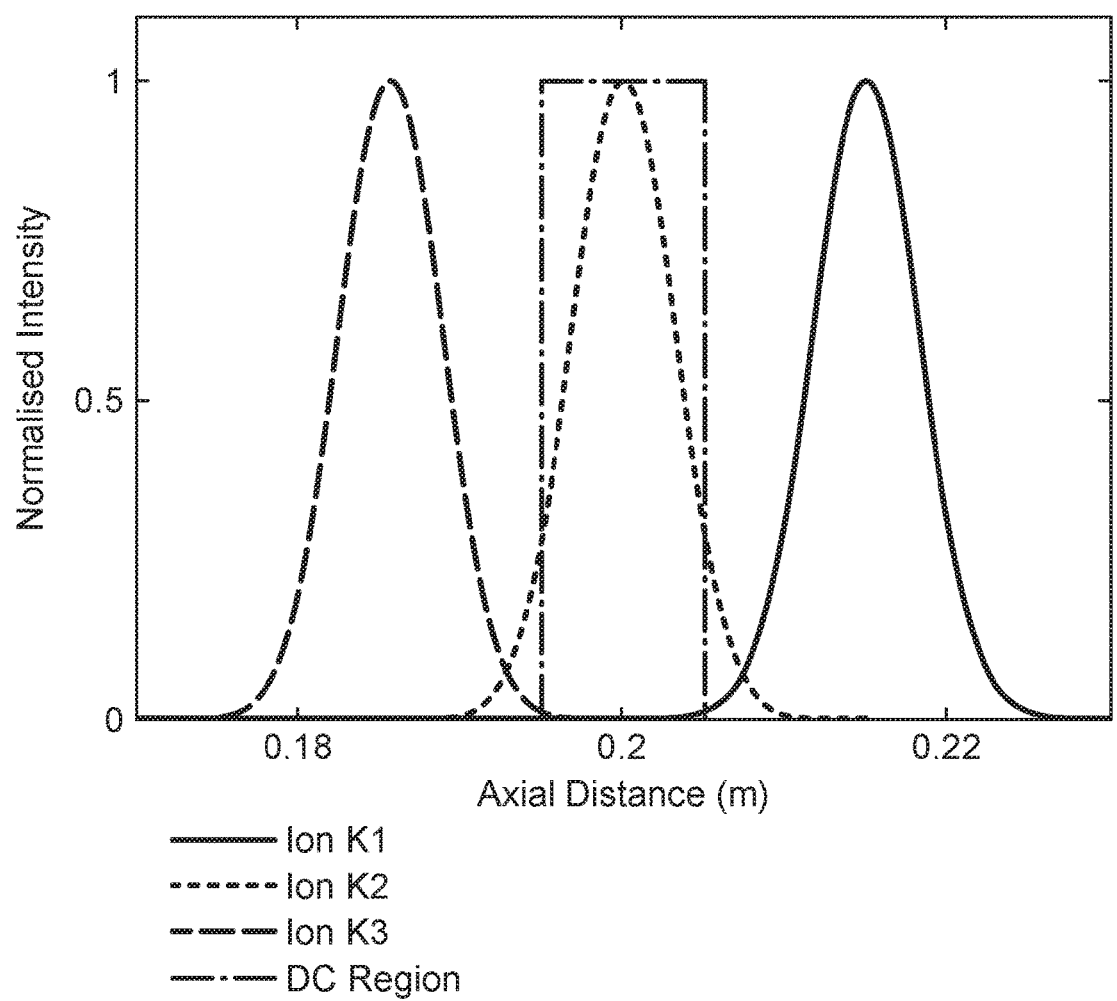
FIG. 5 is a plot showing the ion position distributions for three ions at the end of the device.

To achieve 3*δ from the mean of the faster/slower ion peak to the edge of the drift region (ie 0.1% of the unwanted ion transmitted), the resolving ability can be calculated as being ~6.7 for the trapping case. FIG. 5 plots the ion position distributions for this system at the end of the device (where ion K1 and ion K3 have K-values calculated to give 3*δ separation of the peak centre from the drift region).

Note that in a conventional IMS the resolution is defined as K/dK where dK is the FWHM of the peak in K. In order to operate as a filter, greater separation may be required, i.e. as the peak shape in time of the ion elution is not retained. For instance, overlapping peaks that would be sufficiently separated in an IMS spectrum would potentially lead to mixed transmission in the case of a filter.

One further limitation imposed by diffusion is that transmission loss of the ion of interest can occur if the peak broadens sufficiently that the edges of the peak exit the drift region. In the example above δ for ion K2 is 3.2 mm, and hence some loss would be expected from a 10 mm drift region for a trap fill system (as we see in FIG. 5, the ion K2 position distribution is larger than the DC region).

From the analytic expression above it can be seen that to increase the resolving ability either the length L of the entire cell can be increased, or the length of the DC regions, Lr, can be decreased. It will also be appreciated that for a given system, upstream trapping may increase the resolving ability compared to a continuous beam input. To account for diffusional effects, the usual methods for increasing IMS resolution, namely increasing the length L or the field E, can be employed. Note that if we make Lr too small the transmission of the ion of interest may be reduced due to diffusion effects. There may also be various practical considerations that will place a lower limit on Lr.

For the continuous beam case the duty cycle is fundamentally related to the ratio of the size of the DC regions to the kill regions, Lr/Lk. With upstream trapping where ions are periodically trapped and injected into the DC regions, a duty cycle of 100% can be achieved. Alternatively, multiple filters could be arranged to operate in parallel, with the timing of the DC regions then being arranged such that ions would always (or more often) be filling a DC region that was at the entrance end of one of the filters, hence increasing the duty cycle for the continuous beam case.

The regions between the DC drive field local separation regions may be configured to remove ions from the system, as shown in FIG. 3 above, such that ions that do not have the desired mobility are not transmitted. The "kill" regions that separate the DC regions are required as otherwise high mobility ions would surf at the front of the DC region, while low mobility ions could be swept up by subsequent DC regions.

Various practical implementations of the kill regions can be envisaged. For example, confining RF voltages could be disabled while a DC field could drive ions towards the electrodes. Alternatively ions could be driven through an exit orifice, e.g. a slot running down the device that is usually shielded by RF. Another alternative is that the ions could be dragged through the kill regions by a large travelling DC potential well, these ions would be transmitted to the end of the device but discarded at that point or subsequently.

The ions need not be removed from the device in the "kill" regions. For example, the DC local separation regions could have a barrier at each end, so that those ions that are filtered out will then accumulate at the front/back barrier. These ions can then be discarded after exiting the device, or they could be transmitted (giving a device which filters out a specific mobility but retains everything else as well).

Likewise a DC well could be provided in the centre of the kill region that would function in the same way. Alternatively if ions can be filtered out of the device within the kill regions, e.g. through an exit slot, then again we have a device that filters one mobility but retains the rest of the range. These alternatives would allow operation as a reverse filter (i.e. transmitting everything except the specific mobility), or the remainder of the mobility range could be analysed in a downstream analyser or further manipulated as desired (e.g. trapped/activated, etc.).

In an additional embodiment we apply quadrupolar resolving DC to the DC regions. In this case the device would be constructed as a segmented quadrupole. In the DC regions we would apply resolving DC to the opposing segments of the quadrupole in the usual fashion to obtain the desired m/z resolution. While the analytic performance of quadrupoles degrades with increasing pressure, it is still possible to obtain relatively low m/z resolution filtering at elevated pressures. The resolving quadrupole DC could be disabled in the "kill" regions, or it could be left as is, or it could be increased (i.e. over-resolving). Applying over-resolving DC to the "kill" regions is a further possible method to eliminate ions that move into these regions.

In an additional embodiment, the device could be configured to apply quadrupolar resolving DC to the DC regions. This would allow simultaneous filtering by (e.g.) mobility and mass to charge ratio.

The device may be RF confined radially (e.g. a SRIG or segmented multipole) although the method is applicable to unconfined systems or those that periodically re-confine. Confinement can be RF or some combination of RF and DC. The system could also be an extended system in one-axis, e.g. a slot instead of a tunnel. For example multiple parallel filters could be produced by an array of upper/lower RF/DC pads with appropriate voltage control.

The separation in the regions can be accomplished by other methods than a DC ramp as shown in FIG. 3 and FIG. 4 above. For example, the separation could be achieved using travelling waves ("T-waves"). While the relationship of the drift velocity to mobility is different for T-wave systems compared to linear field DC systems, a given ion will still travel with a mean drift velocity that is related to its mobility K and hence the operation of the device is fundamentally the same.

For example, in a travelling wave device ions of a sufficiently high mobility are driven along by a single travelling wave (e.g. DC barrier), effectively moving at the speed of the travelling wave. Thus, if the speed of a local separation region is selected to match the speed of the travelling waves within that local separation region, the device acts as a low mobility cut-off filter, where all ions that are not carried along by a single travelling wave will have a lower drift velocity than the local region and thus be filtered out.

Where multiple local separation regions are provided, e.g. as shown in FIG. 4, different regions can have different DC ramp gradients such that they will (each) filter for a different mobility. For an MRM instrument this could be particularly advantageous, e.g. since consecutive DC regions could be arranged to filter based on mobility for consecutive MRM parent ions. The drift velocity of consecutive regions may be identical, and so the DC ramp gradient may be varied to filter for different mobilities. However, for significant changes in mobility this may require applying non-ideal DC ramp gradients (low ramp gradients reduce resolution, high gradients may exceed the low field limit/cause heating). Thus, it is also possible to cause different local separation regions to travel at different velocities (thus allowing filtering for different mobilities with the same DC ramp gradient). In this case, the spacing between consecutive DC regions could be adjusted to ensure the regions do not overtake each other (although the system could also be configured so that the regions can overtake each other).

The DC fields (or equivalent separation fields e.g. T-waves) need not be constant across the local separation regions. For instance, a varying field could be used to alter the properties of the device. For example, if the field is lower at the front edge of the region and higher at the back edge of the region, then this will tend to increase the mobility range that is transmitted by the region. This will also lead to some focusing of the ion of interest, i.e. the diffusional spread will be reduced. Alternatively the opposite configuration is possible, in this case ions will tend to fall out of the region, this might be used to increase resolution at the cost of transmission. Note that field relaxation will tend to produce non-constant fields at the boundaries of the DC regions in the conventional case, this modification would be to extend this property over the whole region or a substantial part of it.

Although less so than with conventional IMS devices, the output of the device will in general still be somewhat packetized in time, e.g. approximately 50/50 for the case where Lr=Lk. Thus, one or more downstream ion guides could be arranged such that this packetization is reduced or eliminated, with consequent advantages for downstream analysers/detectors.

Figure 6:
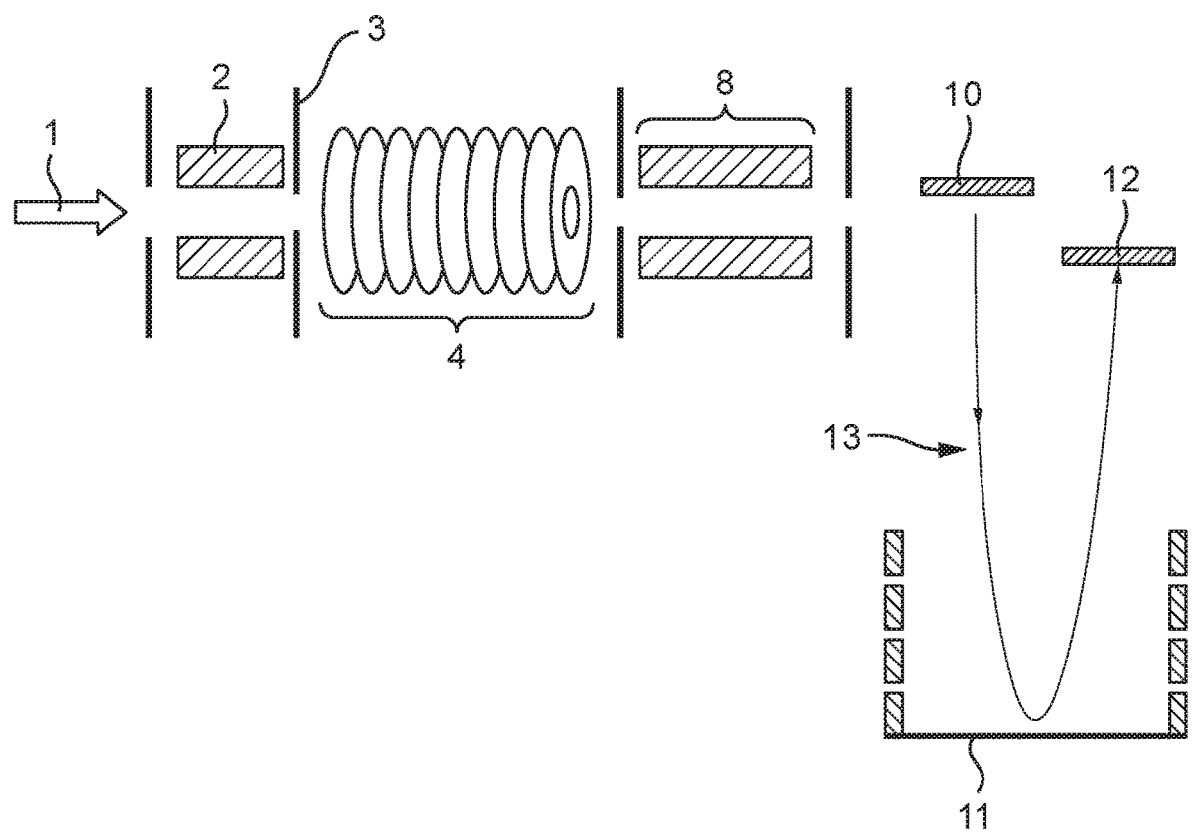
FIG. 6 shows an example of a mass spectrometer within which an ion filtering device as described herein may be employed.

FIG. 6 shows an example of a mass spectrometer incorporating an ion filtering device 4 according to an embodiment. As shown, a set of ions 1 are generated from an ion source (not shown) and passed towards the ion filtering device 4. Optionally, before the ions 1 are passed into the ion filtering device 4, the ions 1 may be stored in an upstream ion trap 2, and periodically released into the ion filtering device 4 for filtering.

After the ions have been filtered in the manner described herein, the ions may then be passed through various further ion guiding and/or manipulating components 8 which may include, for example, one or more ion guide(s), collision cell(s), ion separators, further filtering devices, etc. The ions are then passed towards mass analyser. For instance, as shown in FIG. 6, the ions may be passed into a TOF mass analyser wherein the ions are pulsed orthogonally from a pusher electrode 10 into a TOF drift region 13 including a reflectron 11 and directed onto a suitable ion detector 12. However, although FIG. 1 shows a TOF mass analyser it will be appreciated that any suitable mass analyser may be employed.

Although various embodiments have been described above in relation to ion mobility separation, it will be appreciated that the same principle of operation can be applied to separation based on different ion characteristics, e.g. TOF, m/z, mixed m/z and mobility, FAIMS, etc.

Similarly, although embodiments have been described above in relation to a linear field being applied along the axis of a device, it will be appreciated that the embodiments could also be implemented in a cyclic device.

The device could be switched between operation as a filter as disclosed here and operation as a conventional IMS.

A gas flow could also be used to cause the ions to separate along the device and/or to increase the effective resolving power of the device.

Accordingly, although the present invention has been described with reference to various embodiments, it will be understood by those skilled in the art that various changes in form and detail may be made without departing from the scope of the invention as set forth in the accompanying claims.

The invention claimed is:

1. A method of filtering ions according to a physicochemical property using a device comprising a plurality of electrodes and one or more voltage source(s) arranged and adapted to apply voltages to the plurality of electrodes, the method comprising:
generating using the one or more voltage source(s) one or more local separation region(s), wherein ions can be separated within each local separation region according to the physicochemical property; and
moving each local separation region axially along the device with a certain velocity such that, for each local separation region, ions having a value of the physicochemical property falling within a selected range are transmitted axially along the device with that local separation region whereas ions having higher and/or lower values of the physicochemical property falling outside that range escape the local separation region,
wherein any ions that escape the local separation region(s) are removed from within the device and/or otherwise kept apart from those ions falling within the selected range(s).

2. The method of claim 1, wherein, for each local separation region, ions having a value of the physicochemical property falling within the selected range are transmitted axially through the device towards an ion exit, whereas ions having values falling outside the selected range of the physicochemical property are not transmitted through the device and are lost.

3. The method of claim 2, wherein ions escaping the local separation region(s) are driven out of the device and/or driven towards the electrodes.

4. The method of claim 1, wherein, for each local separation region, ions having a value of the physicochemical property falling within the selected range are transmitted axially through the device towards an ion exit as a first ion packet, while whereas any ions having higher and/or lower values of the physicochemical property and that escape from the local separation region are transmitted towards the ion exit as one or more separate ion packets.

5. The method of claim 4, comprising generating using the voltage source(s) one or more DC potential wells or barriers adjacent to the local separation regions, wherein any ions escaping a local separation region are trapped by the one or more DC potential wells or barriers and transmitted as a corresponding one or more ion packets towards the ion exit.

6. The method of claim 4, wherein the ions that escape the local separation region(s) are discarded at the exit of the device.

7. The method of claim 1, wherein, for each local separation region, ions having a value of the physicochemical property falling within the selected range may be transmitted axially along the device, whereas ions having values falling outside the selected range of the physicochemical property are ejected radially from the device for onward transmission.

8. The method of claim 1, wherein the physicochemical property is ion mobility.

9. The method of claim 1, wherein each local separation region comprises an axial DC gradient for separating ions according to their ion mobility.

10. The method of claim 1, wherein ions are confined radially within the device.

11. The method of claim 1, comprising applying a mass or mass-to-charge ratio filtering field at least to the local separation regions within the device such that only ions having a certain mass to charge ratio or mass to charge ratio range are transmitted through the device.

12. The method of claim 1, comprising generating a plurality of local separation regions, wherein each local separation region acts to axially transmit ions having a value of the physicochemical property falling within a respective range of the physico-chemical property.

13. The method of claim 12, wherein different local separation regions act to filter different ranges of the physicochemical property.

14. The method of claim 1, comprising injecting a packet ions through an ion entrance of the device when a local separation region is coincident with the ion entrance such that ions within the packet having values of the physicochemical property within a selected range are transmitted along the device along with the local separation region whereas ions having values falling outside the selected range escape the local separation region.

15. A device for filtering ions according to a physicochemical property, the device comprising:
a plurality of electrodes; and
one or more voltage source(s) arranged and adapted to apply voltages to the plurality of electrodes so as to generate, in use, one or more local separation region(s), wherein ions can be separated within each local separation region according to the physicochemical property, and
wherein each local separation region moves axially along the device such that with a certain velocity such that, for each local separation region, ions having a value of the physicochemical property falling within a selected range are transmitted axially along the device with that local separation region whereas ions having higher and/or lower values of the physicochemical property falling outside that range escape the local separation region,
wherein any ions that escape the local separation region(s) are removed from within the device and/or otherwise kept apart from those ions falling within the selected range(s).

16. The device of claim 15 wherein, for each local separation region, either:

(a) ions having a value of the physicochemical property falling within the selected range are transmitted axially through the device towards an ion exit, whereas ions having values falling outside the selected range of the physicochemical property are not transmitted through the device and are lost;

(b) ions having a value of the physicochemical property falling within the selected range are transmitted axially through the device towards an ion exit as a first ion packet, while whereas any ions having higher and/or lower values of the physicochemical property and that escape from the local separation region are transmitted towards the ion exit as one or more separate ion packets; or (c) ions having a value of the physicochemical property falling within the selected range may be transmitted axially along the device, whereas ions having values falling outside the selected range of the physicochemical property are ejected radially from the device for onward transmission.

17. The device of claim 15, wherein the device is operable to be switched between a filtering mode of operation and a second mode of operation wherein ions are separated according to the physicochemical property.

18. The device of claim 15, wherein the device is a linear or axial device wherein that ions pass from ion entrance at one end of the device towards ion exit at other end of the device.

19. The device of claim 15, wherein the device comprises a stacked ring ion guide or wherein the device comprises a segmented multipole ion guide.

20. A method of filtering ions according to ion mobility using a device comprising a plurality of electrodes and one or more voltage source(s) arranged and adapted to apply voltages to the plurality of electrodes, the method comprising:

generating using the one or more voltage source(s) a plurality of local separation region(s), wherein ions can be separated within each local separation region according to their ion mobility; and moving each local separation region axially along the device with a certain velocity such that, for each local separation region, ions having a value of ion mobility falling within a selected range are transmitted axially along the device with that local separation region whereas ions having higher and/or lower values of ion mobility of the physicochemical property falling outside that range escape the local separation region, wherein any ions that escape the local separation regions are removed from within the device and/or otherwise kept apart from those ions falling within the selected range(s).

* * * * *